Figure 1:
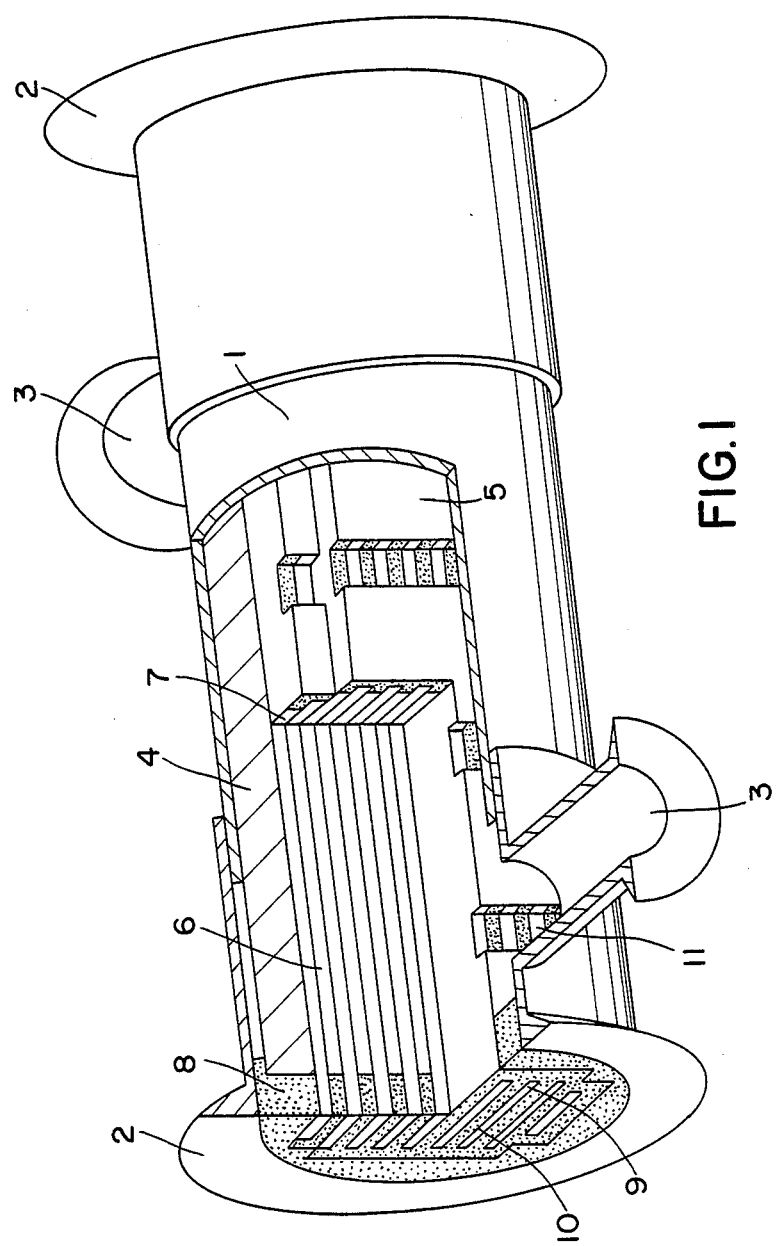

United States Patent [19]

Lueck et al.

[11] Patent Number: 4,936,988
[45] Date of Patent: Jun. 26, 1990

[54] DIAGONAL FLOW FILTER MODULE

[75] Inventors: Hans B. Lueck, Dresden; Bernd Heinrich, Dittersbach, both of German Democratic Rep.

[73] Assignee: Akademie der Wissenschaften der DDR, Berlin, German Democratic Rep.

[21] Appl. No.: 358,674

[22] Filed: May 30, 1989

[30] Foreign Application Priority Data

May 30, 1988 [DD] German Democratic Rep. ... 316157

[51] Int. Cl.⁵ ............................................. B01D 61/50
[52] U.S. Cl. ............................ 210/321.75; 210/321.84
[58] Field of Search ........... 210/321.6, 321.72, 321.75, 210/321.84

[56] References Cited

U.S. PATENT DOCUMENTS 4,737,260  4/1988  Strathmann et al. ............... 204/301

Primary Examiner—Frank Sever
Attorney, Agent, or Firm—Schweitzer & Cornman

[57] ABSTRACT

The invention relates to a diagonal flow filter module, particularly for ultra- and microfiltration.

The diagonal flow filter module consists of a cuboid stack element (5) with alternating flow channels (9) for crude solution or retentate and filtrate channels (10), which are separated from one another in each case by a filter membrane (6). The flow channels (9) are closed off at the side walls of the stack element (5), while the filtrate channels (10) have openings at the side walls for the discharge of the filtrate. The flow channels (9) are open at the end faces of the stack element (5) and the filtrate channels (10) are closed. The ends of the stack element (5) are sealed to a housing (1) with a synthetic resin composition. Sealed to the end faces there are end caps (12) with the connections for crude solutions and retentate which, together with the seal between the stack ends and the housing (1), ensures a reliable separation between retentate and filtrate space. The filtrate leaves the stack element (5) at the side walls, is collected in the housing (1) and withdrawn through one or two drainage connecting pieces.

The diagonal flow filter module has an improved flow guidance system and permits a larger connection cross section to be realized.

6 Claims, 2 Drawing Sheets

DIAGONAL FLOW FILTER MODULE

FIELD OF INVENTION

The invention is directed to a diagonal flow filter module, particularly for dynamic filtration in the area of ultra- and microfiltration in biotechnology, the food and beverage industry and the pharmaceutical industry, as well as in environmental technology.

BACKGROUND INFORMATION AND PRIOR ART

For dynamic filtration in the area of ultra- and microfiltration, various separating devices are known, which are used in the form of filter cassettes, spiral coil modules and capillary or tubular modules.

In the German Auslegeschrift 2,920,253, a filter cassette is described, in which the fluid streams are distributed by boreholes disposed in the edge at least two opposite sides. The complicated flow guidance system and the small cross sections of the flow channels generally lead to an appreciable resistance to the flow in the filter cassettes. Such resistance is very undesirable.

Spiral coil filters are preferred for separating tasks, in which there are only small filter throughputs of about 100 L/m$^2$/hour as, for example, in the case of reverse osmosis and ultrafiltration. The long path, which the filtrate must cover in the filter pockets, also causes a high flow resistance here.

Capillary modules, like those used preferably for dialysis, reverse osmosis and ultra- and microfiltration, have a low flow resistance. They are also used successfully for separating tasks in the industrial sector. The possibilities of using this form of the module with its advantageous flow are restricted, however, by the limited availability of membranes in capillary or tubular form. The availability of planar membranes with different pore diameters and from different membrane materials is significantly greater than that of capillary membranes.

OBJECT OF THE INVENTION

It is an object of the invention to provide a diagonal flow filter module with planar membranes, which has an improved and, at the same time, a simple flow guidance system and, above all, short filtrate paths, and thus enables a large connection cross section to be realized.

SUMMARY OF THE INVENTION

This objective is accomplished in accordance with the main claim. The dependent claims relate to advantageous embodiments.

The inventive diagonal flow filter module comprises at least one, especially a cuboid stack element, which is accommodated in a housing, and consists of planar filter membranes with interposed layers of a supporting material, which form flow channels for the crude solution or the retentate and filtrate channels, which are disposed alternately one above the other and separated from one another by filter membranes in the form of films. The flow channels for crude solution or retentate are closed off at the side walls of the stack, while the filtrate channels have openings at the side walls to discharge the filtrate. The flow channels are open at the end faces of the stack and the filtrate channels are closed. The ends of the stack are sealed into the housing with a synthetic resin composition. At the end faces, there are caps with connections for the crude solutions and retentate. The caps are sealed to the end faces and, together with the seal between the stack ends and the housing, ensure a reliable separation between the retentate space and the filtrate space. The filtrate leaves the stack at the side walls, is collected in the housing and can be removed through one or two drainage connection pieces.

The invention is explained in greater detail in the following by means of examples of the operation and with reference to the drawings, it being understood that the examples are given by way of illustration and not by way of limitation. In the drawings, FIG. 1 shows a partial section of a diagonal flow filter module and FIG. 2 a partial section of a diagonal flow filter cartridge.

As shown by FIG. 1, the inventive diagonal flow filter module consists of a housing 1, two connections 2 in the form of connecting flanges for the solution and the retentate, two lateral drainage connection pieces 3 for discharging the filtrate, two supporting elements 4 and a stack element 5 of filter membranes 6 and interposed layers 7 of the supporting material which, for reasons of greater clarity, is not shown in detail in FIG. 1. The ends of the stack element 5 are sealed to the housing 1 with a synthetic resin sealing composition 8. The stack element 5 consists of flow channels 9 for the crude solution or the retentate and filtrate channels 10, which lie one above the other alternately and are separated from one another by the filter membranes 6.

The flow channels 9 are open at the end faces, while the filtrate channels 10 are sealed shut by gluing or welding. The side walls of the stack element 5 are sealed with a synthetic resin composition, so that the flow channels 9 are sealed off from the filtrate channels 10. The seal with the synthetic resin composition is produced in such a manner, that this composition can penetrate only into the flow channels 9. The drainage openings 11 are lateral grooves, milled or sawn to only such a depth, that the filtrate channels 10 alone are open. As supporting material for the interposed layers 7 for the flow channels 9 and the filtrate channels 10, any type of fabric, net screen structure or even profiled films, which offer the least possible resistance to the flowing liquid, is suitable.

In order to be able to install a large filter area in the housing 1, the stack element 5 is constructed of several individual stacks with different cross sections, so that the circular cross section is well utilized. Within the scope of the inventive concept, combinations, other than those shown in FIG. 1 for the stack element, are also possible.

To produce the stack element 5, the stacks are sealed individually to the side walls and the grooves are generated as drainage openings 11. The individual stacks are united by gluing their ends to the stack element and, together with the upper and lower supporting element 4, are sealed to the end face of the housing with a synthetic resin composition.

The supporting elements 4 consists of plastic and prevent any impermissible expansion of the stack element 5, when the latter is acted upon by pressure during the filtration.

Instead of the circular cross section, the housing 1 may also have a rectangular cross section in the area between the connections 2. In this case, it is possible to do without the supporting elements 4, if the stack element 5 is supported directly by the housing wall.

For the filtration with this inventive diagonal flow filter module, the solution is supplied under pressure at the end face and flows through the flow channels 9. Because of the pressure gradient between the flow channels 9 and the filtrate channels 10, a portion of the liquid is forced through the filter membranes 6.

The filtrate leaves the filtrate channels 10 through the drainage openings 11, which are constructed as grooves and which are at short intervals from one another in the two side walls of the stack elements 5. The filtrate then reaches the housing 1 and can be removed over the drainage connecting pieces functioning as filtrate outlet 3.

Figure 2:
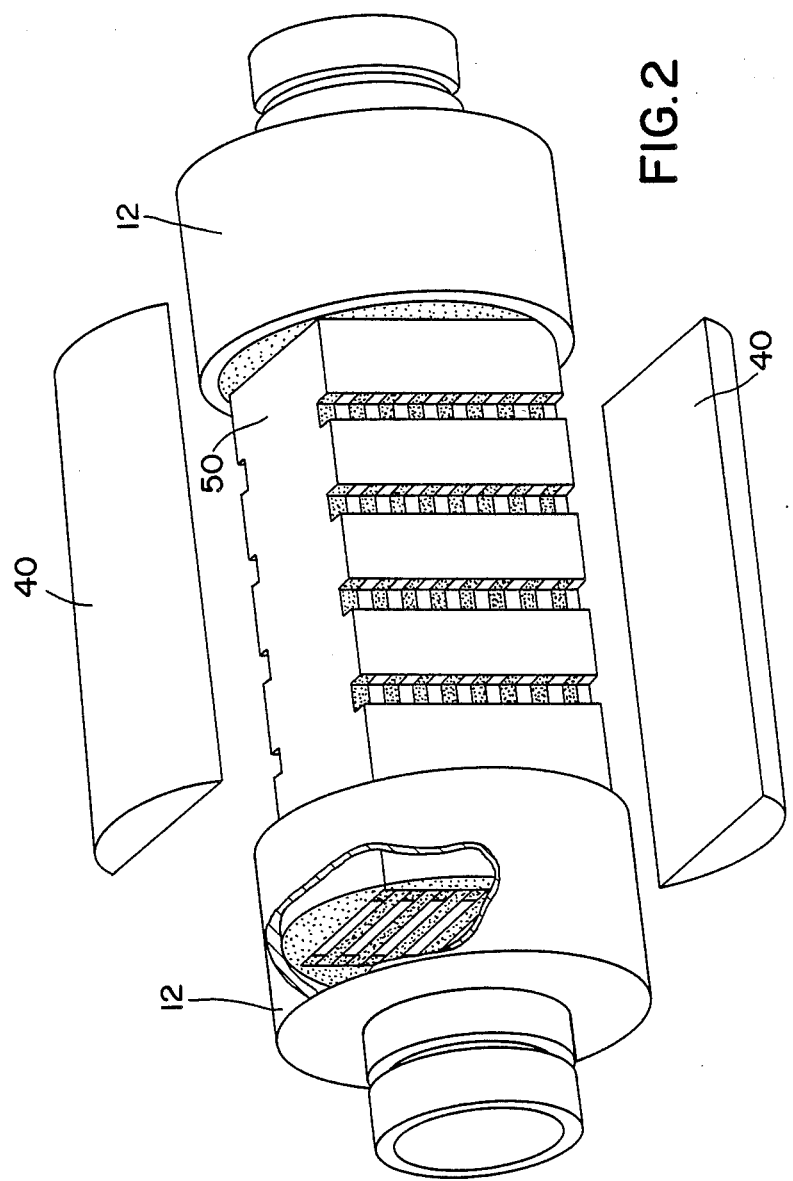

The inventive diagonal flow filter module is shown in FIG. 2 as a cartridge. The ends of the cuboid stack element 5 are sealed in end caps 12 with a synthetic resin composition. The cartridge, together with the two supporting elements 4 consisting of a synthetic resin composition, is introduced into a tubular filter housing, which has appropriate connections for supplying the solution and discharging the retentate as well as the filtrate. Sealing is effected by means of O rings.

The strength and reliable handling of the cartridge are ensured by sealing the stack element at the side with a synthetic resin composition.

The inventive, diagonal flow filter module is distinguished by short filtrate paths and a simple flow guiding system which, in comparison with the state of the art, leads to a smaller pressure loss and permits large connecting cross sections to be realized.

We claim:

1. A cross-flow filter comprising a housing having two end connection faces at opposite ends thereof and having a sidewall between said end connection faces, a stack element disposed within said housing, a collection space between said housing and said stack element, a plurality of filter membranes disposed in said stack element in a substantially spaced, parallel relationship relative to each other, means defining alternate crude/retentate spaces between filter membranes including means for enabling free interconnection of said filtrate spaces with each other and for interconnecting crude/retentate spaces and said filtrate spaces with each other only through said filter membranes, openings from said crude/retentate spaces to said end connection faces, means providing free fluid communication from said col collection space and said filtrate space but sealed from said connection faces, and drainage means in the sidewall of said housing in free fluid communication with said collection space for removing the filtrate from the filter.

2. The cross-flow filter of claim 1, wherein said stack element comprises a plurality of interconnected rectangular stack elements.

3. The cross-flow filter of claim 1, wherein the stack element is supported in said housing by one or more supporting elements.

4. The cross-flow filter of claim 1, wherein the ends of the stack element at said connecting faces are sealed into the housing with a synthetic resin.

5. The cross-flow filter of claim 1, further comprising a cap each disposed over a connecting face for interconnecting the crude/retentate spaces at each end of the filter.

6. The cross-flow filter of claim 1, wherein said filter is a replacement filter cartridge.

* * * * *